(12) United States Patent
Tobimatsu et al.

(10) Patent No.: US 7,813,465 B2
(45) Date of Patent: Oct. 12, 2010

(54) PRESSURE SUPPRESSION AND DECONTAMINATION APPARATUS AND METHOD FOR REACTOR CONTAINER

(75) Inventors: Toshimi Tobimatsu, Chiba-ken (JP); Seiichi Yokobori, Tokyo (JP); Makoto Akinaga, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/088,943

(22) Filed: Mar. 25, 2005

(65) Prior Publication Data

US 2005/0265511 A1    Dec. 1, 2005

(30) Foreign Application Priority Data

Mar. 26, 2004   (JP) .............................. 2004-092318

(51) Int. Cl.
    *G21C 9/00*    (2006.01)
(52) U.S. Cl. ................. 376/283; 376/279; 376/282
(58) Field of Classification Search ............ 376/279, 376/282, 283, 463; 169/37, 90, 38, 19; 239/213; 222/565; 416/18, 24; 290/54
    See application file for complete search history.

(56) References Cited

U.S. PATENT DOCUMENTS

| | | | |
|---|---|---|---|
| 2,556,080 A * | 6/1951 | Glaser et al. ................ 99/455 |
| 2,672,328 A * | 3/1954 | Mart et al. ................... 261/25 |
| 3,459,635 A | 8/1969 | Bevilacqua et al. |
| 3,651,869 A * | 3/1972 | Livingston et al. ............ 169/38 |
| 3,946,490 A * | 3/1976 | Sotman et al. ................ 433/82 |
| 4,732,216 A * | 3/1988 | Polan .......................... 169/38 |
| 4,976,319 A * | 12/1990 | Eberhardt et al. ............ 169/54 |
| 5,011,652 A * | 4/1991 | Tominaga et al. ........... 376/283 |
| 5,087,408 A * | 2/1992 | Tominaga et al. ........... 376/283 |
| 5,372,307 A * | 12/1994 | Sesser ........................ 239/210 |
| 5,612,983 A * | 3/1997 | Henriksson et al. ......... 376/313 |
| 2002/0101951 A1 | 8/2002 | Nakamaru et al. |

FOREIGN PATENT DOCUMENTS

| | | |
|---|---|---|
| CN | 1298184 A | 6/2001 |
| EP | 1 103 981 A2 * | 5/2001 |
| GB | 1 344 308 | 1/1974 |
| JP | 2-222878 | 9/1990 |
| JP | 3-269297 | 11/1991 |
| JP | 6-51087 | 2/1994 |
| JP | 9-318783 | 12/1997 |
| JP | 2001-215291 | 8/2001 |

* cited by examiner

*Primary Examiner*—Johannes P Mondt
(74) *Attorney, Agent, or Firm*—Oblon, Spivak, McClelland, Maier & Neustadt, L.L.P.

(57) ABSTRACT

A pressure suppression and decontamination apparatus for a reactor container which is provided with a reactor pressure vessel containing nuclear core fuel and forms a dry well space including, a dry well cooling unit for cooling a gas in the dry well space and for producing a condensate of the gas, a circulation device for leading the gas in the dry well space to the dry well cooling unit, and a sprinkling device for sprinkling the condensate in the dry well space.

15 Claims, 6 Drawing Sheets

PRESSURE SUPPRESSION AND DECONTAMINATION APPARATUS AND METHOD FOR REACTOR CONTAINER

CROSS-REFERENCE TO RELATED APPLICATIONS

This application is based upon and claims the benefit of priority from the prior Japanese Patent Application No. 2004-92318, filed on Mar. 26, 2004; the entire contents of which are incorporated herein by reference.

BACKGROUND OF THE INVENTION

1. Field of the Invention

The present invention relates to an apparatus and a method for pressure suppression and decontamination for a reactor container, and more particularly to an apparatus and a method for pressure suppression and decontamination for a reactor container which cools the inside of reactor container and suppresses the pressure rise and the density increase of radioactive substances, at an emergency case such as troubles with the coolant system for the reactor.

2. Description of the Background

When a severe trouble such as a trouble with a coolant system takes place in a nuclear reactor, it is possible that the reactor core melts, breaks through the bottom panel board of the reactor pressure vessel and falls into a bottom dry well. At that time, it is possible that a great amount of radioactive substances are generated and non-condensable gas such as hydrogen that is generated through reactions of metal and water fills up in the reactor container and causes a pressure rise in the reactor container. In the worst case, it is possible to exhaust a great amount of radioactive substances into outside air.

In order to take a countermeasure for such an event, it is investigated to install a cooling device for dry well either in a bottom dry well or in a top dry well and to cool the gas in the dry well or the cooling pool water for damaged reactor core. (Reference Patents 1 and 2 described below)

[Reference Patent 1] Japanese Patent Disclosure (Kokai) 2001-83275

[Reference Patent 2] Japanese Patent Disclosure (Kokai) 2001-215291

It is investigated to cool the dry well or the cooling pool water for the damaged reactor core at an emergency case such as troubles with the coolant system for the reactor, as described in the above. But the technology to suppress effectively the pressure rise in the reactor container and the density increase of the radioactive substances has not yet been developed.

SUMMARY OF THE INVENTION

Accordingly, an object of this invention is to provide an apparatus and a method for pressure suppression and decontamination for a reactor container which can suppress the pressure rise in the reactor container and can suppress the density increase of radioactive substances, at an emergency case such as troubles with the coolant system for the reactor.

According to an aspect of the present invention, there is provided a pressure suppression and decontamination apparatus for a reactor container which is provided with a reactor pressure vessel containing nuclear core fuel and forms a dry well space including, a dry well cooling unit for cooling a gas in the dry well space and for producing a condensate of the gas, a circulation device for leading the gas in the dry well space to the dry well cooling unit, and a sprinkling device for sprinkling the condensate in the dry well space.

According to another aspect of this invention, there is provided a pressure suppression and decontamination method for a reactor container which is provided with a reactor pressure vessel containing nuclear core fuel and forms a dry well space, at an emergency case such as troubles with a coolant system of a nuclear reactor including, cooling a gas in the dry well space, producing a condensate of the gas, and sprinkling the condensate in the dry well space.

According to the present invention, it is possible to provide an apparatus and a method for pressure suppression and decontamination for a reactor container which can suppress the pressure rise in the reactor container and can suppress the density increase of radioactive substances, at an emergency case such as troubles with the coolant system for the reactor.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
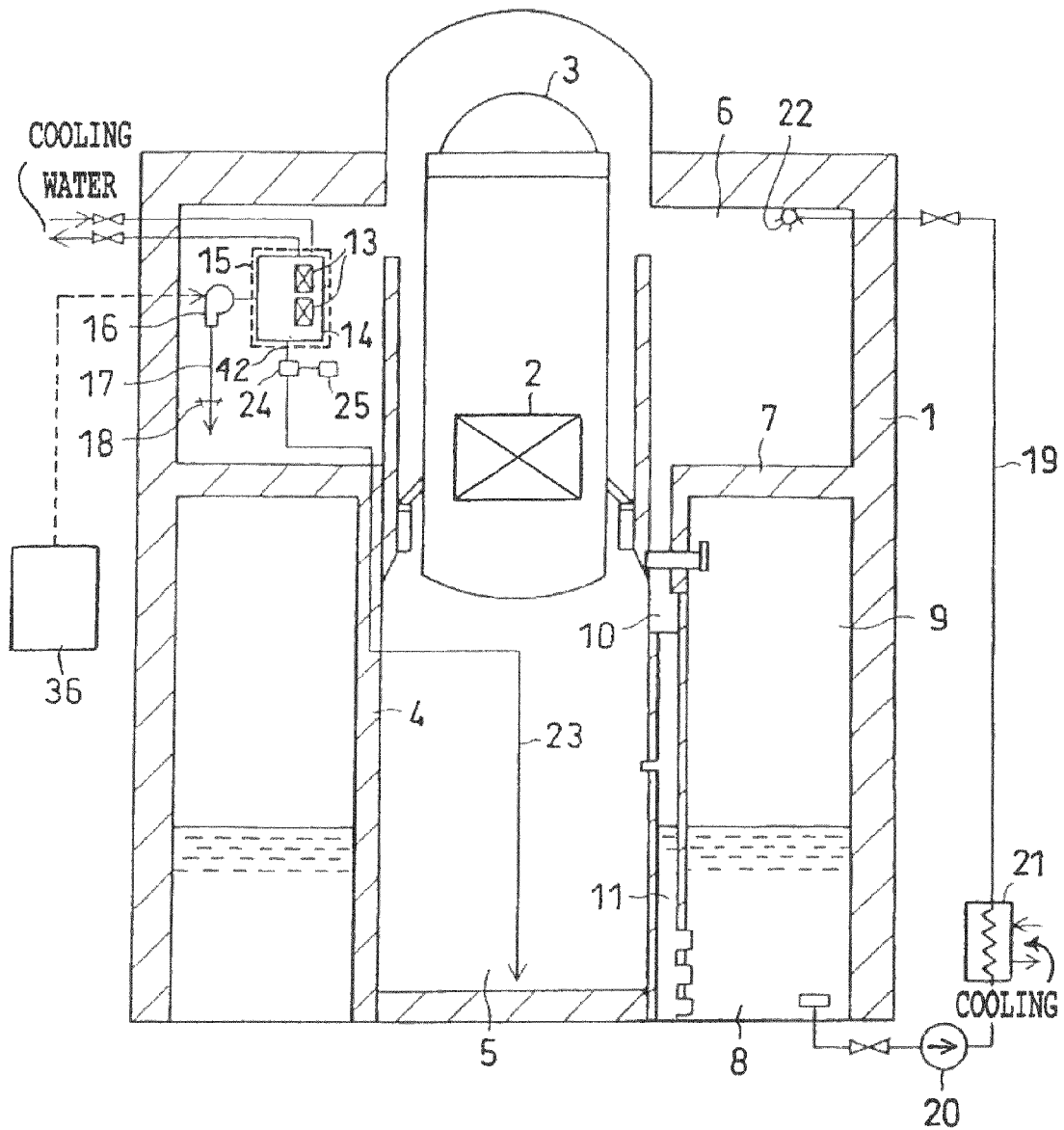
FIG. 1 is a cross section drawing showing a reactor container provided with a pressure suppression and decontamination apparatus for the reactor container according to a first embodiment of the present invention.

Referring now to the drawings, wherein like reference numerals designate identical or corresponding parts throughout the several views, the embodiments of this invention will be described below.

Hereinafter the first and the second embodiments of the present inventions are described by referring to the drawings.

First Embodiment

FIG. 1 is a cross section drawing showing a reactor container provided with a pressure suppression and decontamination apparatus for a reactor container according to a first embodiment of this invention.

In a reactor container 1, a reactor pressure vessel 3 containing a reactor core 2 for holding nuclear fuel is supported by means of pedestals 4. Also, a bottom dry well 5 surrounded by the pedestals 4, a top dry well 6 surrounding the reactor pressure vessel 3 and a pressure suppressing room 9, which is partitioned by a diaphragm floor 7 below the top dry well 6 and contains a pressure suppressing pool water 8 inside are provided in the reactor container 1.

The top dry well 6 and the bottom dry well 5 are communicated hydraulically by means of a communicating canal 10. The both dry wells 5 and 6 and a pressure suppressing room 9 are connected each other by a vent tube 11 which extends into the pressure suppressing pool water 8. It is so constructed that the pressure suppressing pool water 8 is lead by a residual heat removing pump 20 in a residual heat removing line 19, and after the heat removal at a residual heat removing heat exchanger 21, the pressure suppressing pool water 8 is sprinkled from a spray header 22 in the top dry well 5, to form a spray cooling system. This cooling system is used for cooling the reactor container 1 at a high temperature and at a high pressure.

Also, in the reactor container 1, a plurality of dry well cooling units 15 are installed. A fan 16 is connected to each of the dry well cooling units 15. The fan 16 is a device for circulating the gas inside the dry wells 5 and 6 into dry well cooling unit 15. The dry well cooling unit 15 is composed of a casing 14 and a cooling coil 13 involved therein. In the piping of the cooling coil 13, cooling water is flown, and a gas 40 in the bottom and top dry wells 5 and 6 is lead into the casing 14. In details, the inner pressure of the casing 14 is lowered using a fan 16, and thus a flow of the gas is induced by the pressure difference between inside and outside of the casing 14. The gas 40 induced into the casing 14 passes through the outside of the piping of the cooling coil 13 and is cooled. The cooled gas 40 is transferred to everywhere in the bottom and top dry well 5 and 6 through a duct 17 and a damper 18.

Also, the vapor involved in the gas 40 introduced into the casing 14 containing the cooling coil 13 is condensed by flowing water in the cooling coil 13 of the dry well cooling unit 15. And then, in order to compensate the pressure drop due to the condensation, the gas 40 in the reactor container 1 is induced into the casing 14 to reduce the pressure in the reactor container 1. As described in the above, the vapor of which heat is removed at the dry well cooling unit 15 is condensed, and a condensate 41 is lead to a drain sump at the bottom of the bottom dry well 5 through a drain pipe 23. A power source 36 which supplies the power to the fan 16 connected to the dry well cooling unit 15 is connected to an electrical system, which is operative only at the normal operation of the nuclear reactor and stops automatically at an emergency case.

Furthermore, according to the present embodiment, a changeover device 24 and a sprinkling device 25 are provided to the drain pipe 23 which discharges the condensate 41 produced at the dry well cooling unit 15. The condensate 41 produced by the condensation of the vapor involved in the gas 40 in the bottom and top dry wells 5 and 6 is sprinkled in the top dry well 6.

Figure 2:
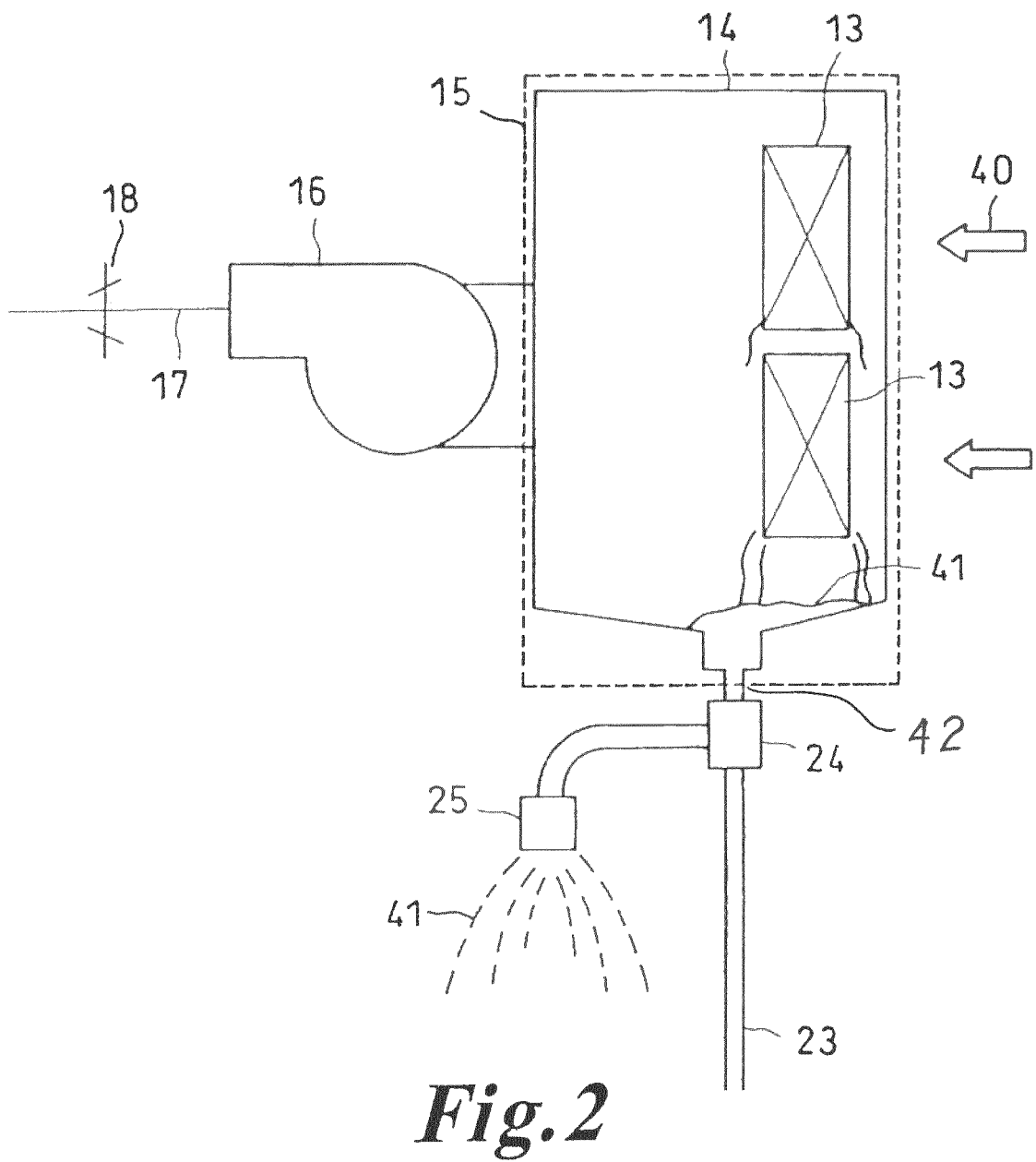
FIG. 2 is a cross section drawing showing a main portion of the pressure suppression and decontamination apparatus for the reactor container according to the first embodiment of the present invention.

FIG. 2 is a cross section showing a main portion of the pressure suppression and decontamination apparatus for the reactor container according to this embodiment. As shown in the drawing, the drain pipe 23, which discharges the condensate 41 from the dry well cooling unit 15 installed as one of the cooling installations in the reactor container 1, is provided with the changeover device 24, which is connected to the cooling unit 15 via abutting connection 42, and the sprinkling device 25.

In this connection, the changeover device 24 has a function that it flows the condensate 14 from the dry well cooling unit 15 to the drain pipe 23 normally and flows to the sprinkling device 25 at an emergency case. The sprinkling device 25 scatters the condensate 41 switched by the changeover device 24 as liquid drops in the dry well space. By this, the surface area of the sprinkled condensate 41 becomes large and the removing efficiency of the radioactive substances is increased.

Figure 3:
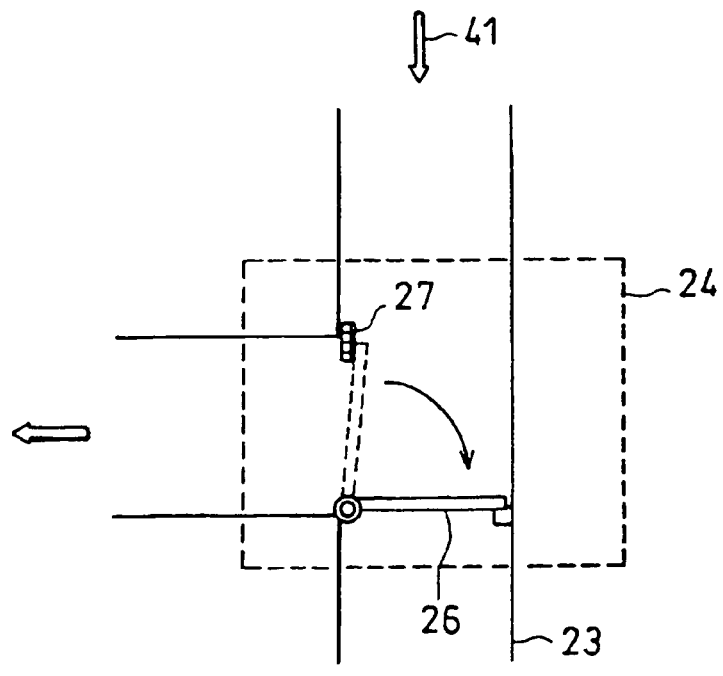
FIG. 3 is a cross section drawing showing a changeover device provided in the pressure suppression and decontamination apparatus for the reactor container according to the first embodiment of the present invention.

FIG. 3 is a detailed cross section of the changeover device 24. The changeover device 24 is provided with a changeover panel 26 which rotates almost 90 degrees and a high temperature melting and adhesive metal 27, which sticks the changeover panel 26 to the change over mechanism and melts at a high temperature. By means of this construction, the high temperature melting and adhesive metal 27 melts when the temperature becomes high at an emergency case, and the changeover panel 26 closes the drain pipe 23, and thereby the flow of the condensate 41 is changed over to the sprinkling device 25.

Figure 4:
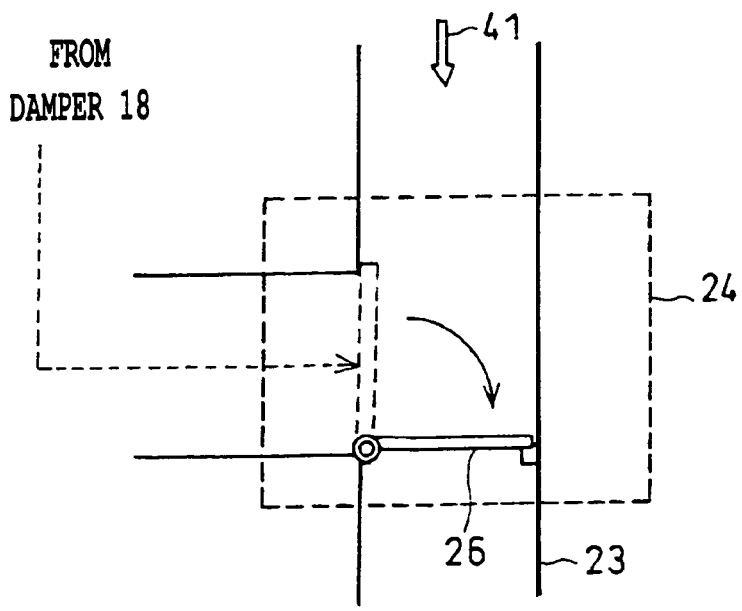
FIG. 4 is a cross section drawing showing another example of a changeover device provided in the pressure suppression and decontamination apparatus for the reactor container according to the first embodiment of the present invention.

FIG. 4 is a cross section of another example of the changeover device 24. The changeover device 24 is operated by the driving force at the opening and closing of the damper 18 mounted in the duct 17 shown in FIG. 1. In detail, the changeover panel 26 is connected with the outlet of the damper 18 mechanically by means of a spring or the like, and opens by utilizing the driving force of the closing damper 18. At an emergency case, the changeover panel 26 closes the drain pipe 23 and changes over the flow of the condensate 41 to the sprinkling device 25.

Figure 5A:
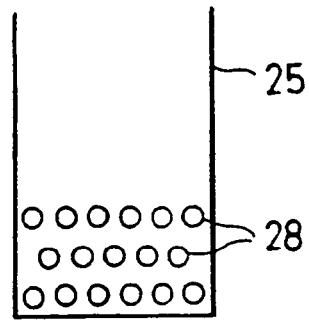
FIG. 5 is a cross section drawing showing a sprinkling device provided in the pressure suppression and decontamination apparatus for the reactor container according to the first embodiment of the present invention.
Figure 5B:
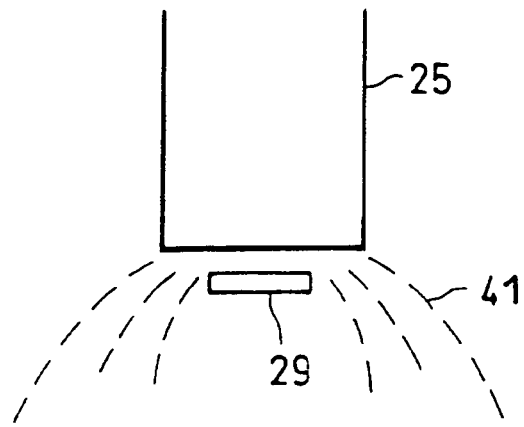
Figure 5C:
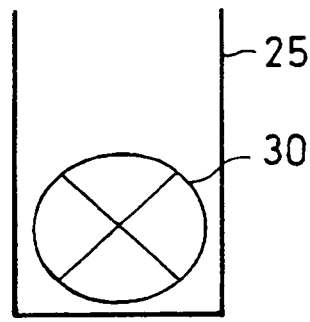

FIG. 5 is a drawing showing the details of the sprinkling device 25. Here, FIG. 5(*a*) shows a construction that a plurality of the sprinkling holes 28 are provided at the end of the outlet of the condensate 41, FIG. 5(*b*) shows a construction that a collision plate 29 is provided to which the condensate collides at the end of the outlet of the condensate 41, and FIG. 5(*c*) shows a construction that a sprinkling blade 30, which scatters the condensate 41, is provided at the end of the outlet of the condensate 41. By means of these constructions, the condensate 41 can be scattered as liquid drops into the dry well atmosphere.

Figure 6:
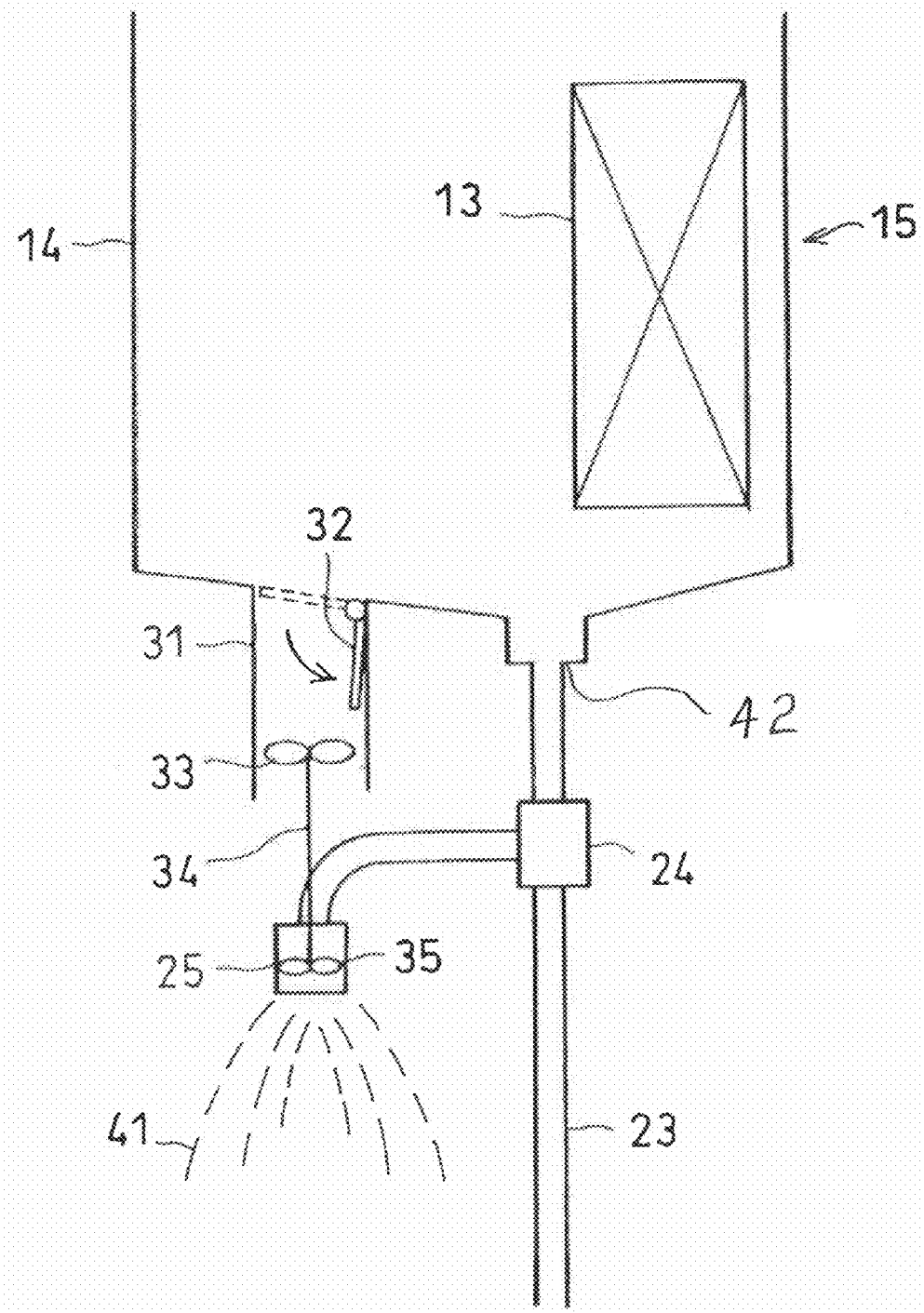
FIG. 6 is a cross section drawing showing a reactor container provided with a pressure suppression and decontamination apparatus for the reactor container according to a modification of the first embodiment of the present invention.

FIG. 6 is a drawing showing a modification of the embodiment of the present invention. In FIG. 6, a mechanism for exhausting in the casing 14 of the dry well cooling unit 15 and the sprinkling device 25 are linked. In this modification, a rotating mechanism 35 for rotating by means of the flow of the condensate 41 in the sprinkling device 25 is provided. A shut-off plate 32 and an exhaust fan 33 are provided at the casing 14 of the dry well cooling unit 15. Further, the rotating mechanism 35 and the exhaust fan 33 are connected by means of a connecting shaft 34. According to this modification, the non-condensed gas accumulated in the casing 14 can be exhausted to the outside, and thereby the condensation of the vapor can be promoted. The shut-off plate 32 closes during an operation of the circulation device and opens during a stoppage of the circulation device. In other words, shut-off plate is configured to be in a closed position during operation of said circulation device and configured to be in an open position during stoppage of said circulation device.

If a case of the loss of coolant accident (LOCA) that the coolant flows out of the inside of the reactor pressure vessel 3 by any reason might occur, a great amount of the mixture of a vapor and a water of high temperature is exhausted into the bottom and top dry wells 5 and 6. This mixture is lead to the pressure suppressing pool water 8 in the pressure suppressing room 9 through the vent pipe 11. When the accident becomes to a severe accident, it is possible that the reactor core 2 in the reactor pressure vessel 3 melts, penetrates the bottom panel board of the reactor pressure vessel 3 and falls into the bottom dry well 5. And then, it is possible that non-condensable gas such as hydrogen produced by the reaction of the large amount of radioactive substances, metal and water is generated in the reactor container 1, and a pressure rise in the reactor container 1 is caused.

Also, at this moment the power source 36 is shut off automatically by the safety reason. Thus, many devices including the fan 16 are stopped. On the other hand, the vapor contained in the gas 40 in the casing 14 is condensed by the cooling coil 13 of the dry well cooling unit 15, and the condensate is produced.

In this connection, according to the embodiment of the present invention, the condensate 41 from the dry well cooling unit 15 is sprinkled into the dry well atmosphere by the changeover device 24 and the sprinkling device 25. Therefore, the radioactive substances in the dry well atmosphere are removed by the liquid drops. Thus the density of the radioactive substances in the dry well atmosphere is reduced.

As described in the above, according to the embodiment of the present invention, the fan 16 as the circulation device that leads the gas 40 from the dry well space into the dry well cooling unit 15 and the sprinkling device 25 which sprinkles the condensate 41 produced by the condensation of the vapor involved in the gas 40 are provided. Thus, the radioactive substances in the reactor container 1 can be removed. Furthermore, it is possible to keep the performance of removing the heat in the dry well cooling unit 15. Therefore, even at an emergency case, it is possible to suppress the pressure in the reactor container 1 and to suppress the density of the radioactive substances.

Second Embodiment

Figure 7:
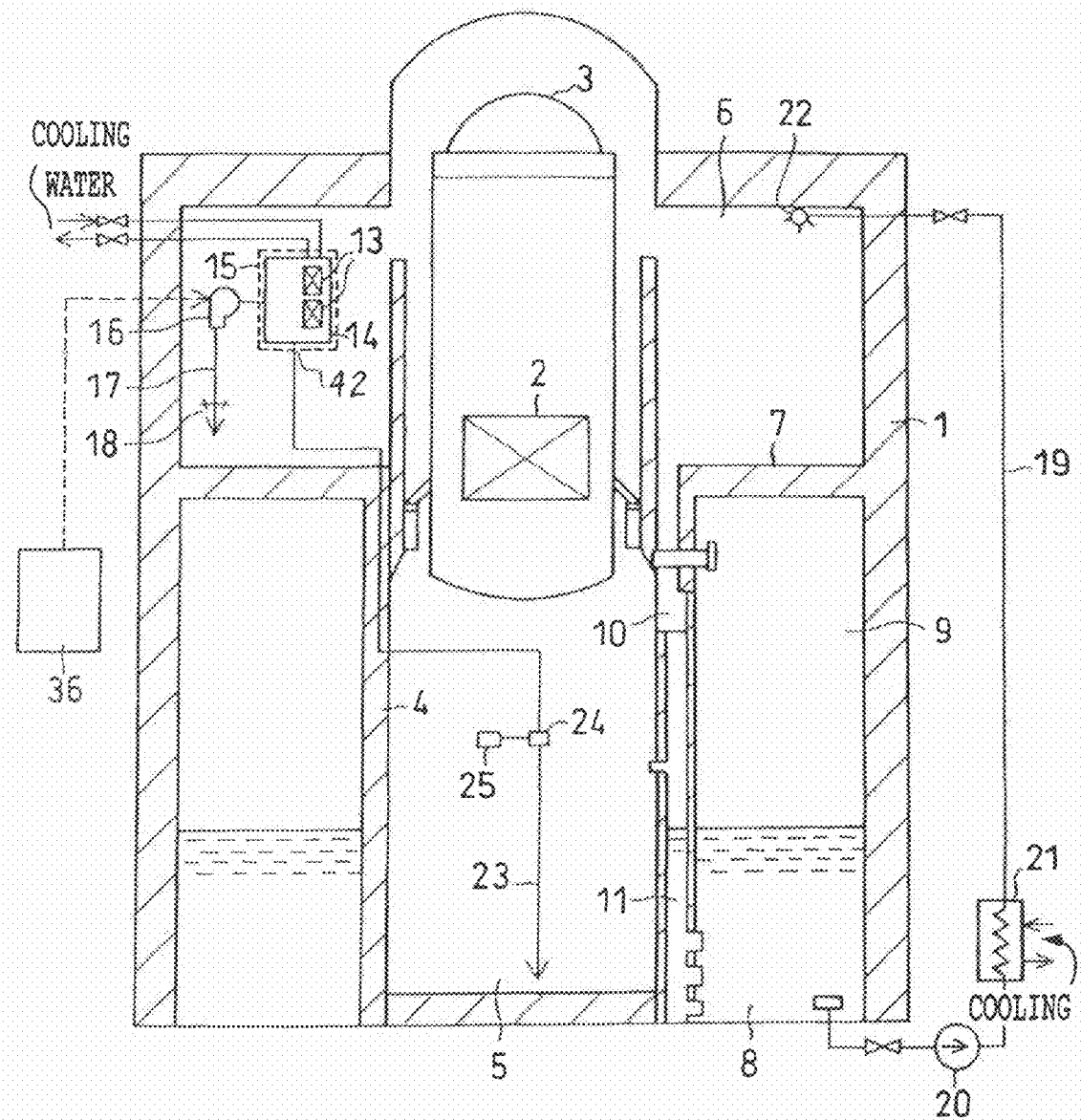
FIG. 7 is a cross section drawing showing a reactor container provided with a pressure suppression and decontamination apparatus for the reactor container according to a second embodiment of the present invention.

FIG. 7 is a cross section drawing showing a reactor container provided with a pressure suppression and decontamination apparatus for a reactor container according to a second embodiment of this invention.

As shown in FIG. 7, this embodiment provides the construction that the change over device 24 and the sprinkling device 25 are provided in the bottom dry well 5. The respective constructions of the dry well cooling unit 15, the changeover device 24 and the sprinkling device 25 are the same as shown in the first embodiment. According to this embodiment, the radioactive substances can be removed efficiently at a range where the density of the radioactive substances is high.

Meantime, it should be understood that the present invention is not limited to the embodiments described in the above. For example, when the embodiment of the present invention is described, a boiling water reactor (BWR) is taken as an example as shown in FIG. 1 and FIG. 7. But this invention can be applied also to pressurized water reactors (PWR). Also, the dry well cooling unit 15 may be provided outside of the reactor container 1 and the intake port and the discharge port may be provided in the reactor container 1.

Obviously, numerous modifications and variations of the present invention are possible in light of the above teachings. It is therefore to be understood that within the scope of the appended claims, the invention may be practiced otherwise than as specifically described herein.

What is claimed is:

1. A pressure suppression and decontamination apparatus for a reactor container including a dry well space having an upper dry well and a lower dry well, the reactor container housing therein a reactor pressure vessel containing nuclear core fuel, said apparatus comprising:
   a dry well cooling unit configured to cool a gas in the dry well space and produce a condensate of the gas;
   a circulation device configured to circulate the gas in the dry well space through said dry well cooling unit;
   a sprayer head connected to an outlet of a pump, disposed in the upper dry well, and configured to cool the reactor container;
   a drain pipe extending from said dry well cooling unit to the lower dry well, said drain pipe being configured to discharge the condensate from said dry well cooling unit, the drain pipe being directly connected to a changeover device, the changeover device being directly connected to the cooling unit; and
   a sprinkling device connected to said drain pipe and configured to sprinkle condensate in the dry well space, the sprinkling device being disposed lower than the dry well cooling unit and connected to receive condensate from the cooling unit via the drain pipe.

2. The pressure suppression and decontamination apparatus according to claim 1, wherein said changeover device connects said sprinkling device with said drain pipe, and wherein said changeover device includes a changeover panel that has a first position that allows the condensate to flow from said dry well cooling unit to an end of said drain pipe in the lower dry well and a second position that allows the condensate to flow from said dry well cooling unit to said sprinkling device.

3. The pressure suppression and decontamination apparatus according to claim 2, wherein said changeover panel is in the second position when said circulation device is in an emergency state.

4. The pressure suppression and decontamination apparatus according to claim 3, wherein said changeover panel is in the second position when a temperature of said changeover device is higher than a melting temperature of an adhesive metal in the changeover device.

5. The pressure suppression and decontamination apparatus according to claim 3, wherein said changeover panel is configured to move between the first position and the second position by mechanical means.

6. The pressure suppression and decontamination apparatus according to claim 1, wherein said sprinkling device is provided with a plurality of sprinkling holes at an end thereof.

7. The pressure suppression and decontamination apparatus according to claim 1, wherein said sprinkling device is provided with a collision plate, against which a flow of the condensate collides.

8. The pressure suppression and decontamination apparatus according to claim 1, wherein said sprinkling device is provided with a sprinkling blade configured to scatter a flow of the condensate.

9. The pressure suppression and decontamination apparatus according to claim 1, further comprising:
   a rotating mechanism configured to rotate through with a flow of the condensate flowing through said sprinkling device;
   a shut-off plate provided at an opening of a casing of said dry well cooling unit and an exhaust fan provided adjacent to said shut-off plate; and
   a connecting shaft connecting said rotating mechanism and said exhaust fan.

10. The pressure suppression and decontamination apparatus according to claim 9, wherein said shut-off plate is configured to be in a closed position during operation of said circulation device and configured to be in an open position during stoppage of said circulation device.

11. The pressure suppression and decontamination apparatus according to claim 1, wherein said sprinkling device is provided in the bottom dry well.

12. The pressure suppression and decontamination apparatus according to claim 1, wherein said sprinkling device is provided in the upper dry well.

13. A pressure suppression and decontamination apparatus for a reactor container including a dry well space having an upper dry well and a lower dry well, the reactor container housing therein a reactor pressure vessel containing nuclear core fuel, said apparatus comprising:

means for cooling a gas in the dry well space to produce a condensate of the gas;

a sprayer head connected to an outlet of a pump, disposed in the upper dry well, and configured to cool the reactor container;

a drain pipe extending from said means for cooling to the lower dry well, said drain pipe being configured to discharge the condensate from said means for cooling, the drain pipe being directly connected to a changeover device, the changeover device being directly connected to the means for cooling; and means for sprinkling the condensate in the dry well space, said means for sprinkling being connected to said changeover device, the means for sprinkling being disposed lower than the means for cooling and connected to receive condensate from the means for cooling via the changeover device.

14. The pressure suppression and decontamination apparatus according to claim 13, wherein the changeover device fluidly connects said means for cooling to either an end of said drain pipe in the lower dry well or said means for sprinkling.

15. The pressure suppression and decontamination apparatus according to claim 1, wherein the sprayer head is connected to the pump via a residual heat removing line connected to the outlet of the pump and extending upward from the pump toward the sprayer head.

* * * * *